United States Patent
Mercier et al.

(10) Patent No.: US 9,108,736 B2
(45) Date of Patent: Aug. 18, 2015

(54) NACELLE INNER FLOW STRUCTURE LEADING EDGE LATCHING SYSTEM

(75) Inventors: Claude Mercier, South Windsor, CT (US); Thomas G. Cloft, Glastonbury, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 596 days.

(21) Appl. No.: 13/488,483

(22) Filed: Jun. 5, 2012

(65) Prior Publication Data

US 2013/0323013 A1  Dec. 5, 2013

(51) Int. Cl.
| | |
|---|---|
| *F01D 25/24* | (2006.01) |
| *B64D 29/06* | (2006.01) |
| *B64C 7/02* | (2006.01) |
| *F02K 3/06* | (2006.01) |

(52) U.S. Cl.
CPC . *B64D 29/06* (2013.01); *B64C 7/02* (2013.01); *F02K 3/06* (2013.01); *F05D 2230/72* (2013.01); *F05D 2240/14* (2013.01); *F05D 2260/30* (2013.01)

(58) Field of Classification Search
CPC ..... F01D 25/24; F01D 25/243; F01D 25/265; F01D 25/26; F05D 2260/30
USPC .................................................. 415/144, 220
See application file for complete search history.

(56) References Cited

U.S. PATENT DOCUMENTS

| | | | | |
|---|---|---|---|---|
| 3,892,358 | A | * | 7/1975 | Gisslen ...................... 239/265.39 |
| 4,474,344 | A | * | 10/1984 | Bennett ........................ 244/53 B |
| 4,549,708 | A | | 10/1985 | Norris |
| 4,613,099 | A | | 9/1986 | Smith et al. |
| 4,629,146 | A | | 12/1986 | Lymons |
| 4,825,644 | A | | 5/1989 | Bubello |
| 4,859,143 | A | * | 8/1989 | Larrabee et al. .............. 415/142 |
| 5,313,788 | A | | 5/1994 | Wright et al. |
| 5,350,136 | A | | 9/1994 | Prosser et al. |
| 5,524,847 | A | | 6/1996 | Brodell et al. |
| 5,623,820 | A | | 4/1997 | Balzer et al. |
| 8,122,702 | B2 | | 2/2012 | Tsou et al. |

(Continued)

FOREIGN PATENT DOCUMENTS

| | | |
|---|---|---|
| WO | 9426591 A1 | 11/1994 |
| WO | 2010 066958 | 6/2010 |

OTHER PUBLICATIONS

International Search Report and Written Opinion for International Application No. PCT/US2013/041636 completed on Sep. 5, 2013.
U.S. Appl. No. 13/431,356, filed Mar. 27, 2012 "Gas Turbine Engine Thrust Reverser System".
International Preliminary Report on Patentability for International Application No. PCT/US2013/041636 mailed Dec. 18, 2014.

*Primary Examiner* — Ninh Nguyen
(74) *Attorney, Agent, or Firm* — Carlson, Gaskey & Olds, P.C.

(57) ABSTRACT

A latch assembly for securing a nacelle portion of a gas turbine engine includes first and second nacelle flow structures that define a portion of a bypass flowpath. A seal is engageable between the first and second nacelle flow structures. A latch is rotatable about a pivot between latched and unlatched positions. The latch maintains the seal in engagement with the first and second nacelle flow structures in the latched position. A method of opening a nacelle flow structure includes the steps of pivoting a latch from a latched position to an unlatched position, and unlatching a first nacelle flow structure relative to a second nacelle flow structure in response to the latch pivoting step.

17 Claims, 8 Drawing Sheets

(56) References Cited

U.S. PATENT DOCUMENTS

| | | |
|---|---|---|
| 2006/0032237 A1 | 2/2006 | Aumont et al. |
| 2009/0129922 A1 | 5/2009 | Cloft et al. |
| 2011/0116916 A1 | 5/2011 | Porte et al. |
| 2011/0182728 A1 | 7/2011 | Provost |

\* cited by examiner

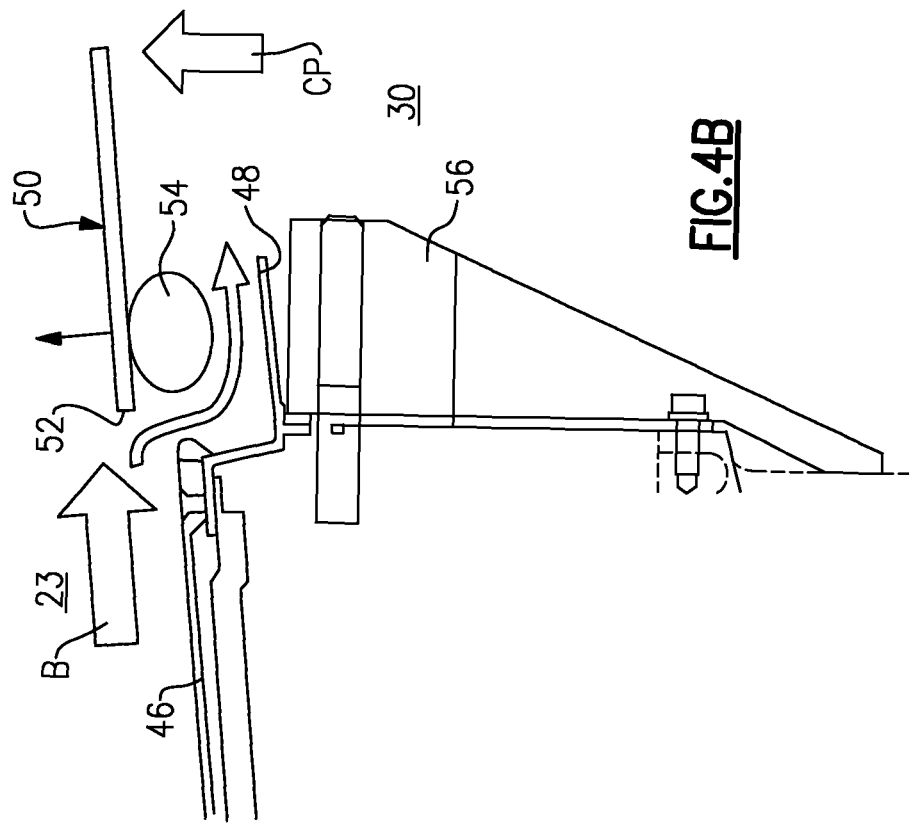
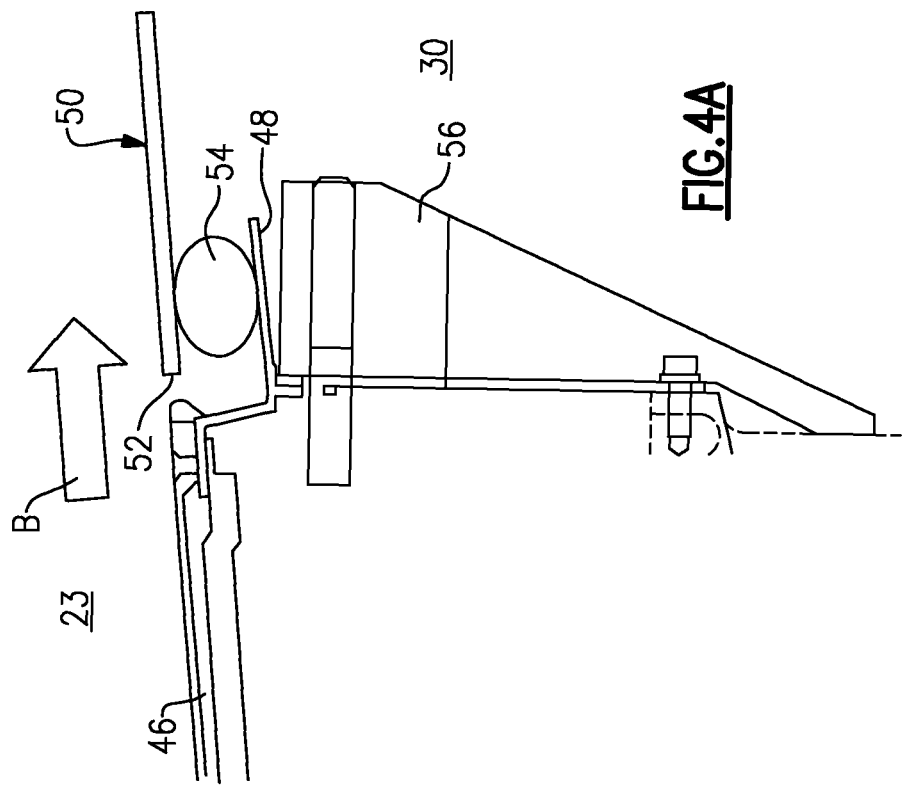

NACELLE INNER FLOW STRUCTURE LEADING EDGE LATCHING SYSTEM

BACKGROUND

This disclosure relates to a nacelle for a gas turbine engine. More particularly, the disclosure relates to a latching system configured to ensure that the latch is able to disengage and release a portion of a nacelle.

One type of gas turbine engine includes a core engine that drives a fan arranged in a bypass flowpath. The bypass flowpath is provided between core and fan nacelles, the core nacelle surrounds the core engine. One example gas turbine engine includes a flow structure that provides inner and outer flow structures that define the bypass flowpath. The flow structure provides portions of the fan and core nacelles along one axial portion of the engine.

The core nacelle encloses a core compartment that houses pressurized conduits, such as compressed air ducts. While the bypass flow pressure in the bypass flowpath aids in maintaining the inner flow structure in a closed and sealed position around the core flowpath, if a high pressure conduit bursts, the pressure within the core compartment may increase and separate a leading edge of the inner flow structure from its mating structure. In this condition, bypass flow may leak past the inner flow structure into the core compartment, which may destroy and dislodge portions of the core and fan nacelles.

To this end, latching assemblies have been proposed, which maintain the leading edge of the inner flow structure in a fully closed position. The latching assembly may be rather complex and may be susceptible to becoming stuck, which requires surrounding structure to be disassembled and removed to gain access to the stuck latch.

SUMMARY

In one exemplary embodiment, a latch assembly for securing a nacelle portion of a gas turbine engine includes first and second nacelle flow structures that define a portion of a bypass flowpath. A seal is engageable between the first and second nacelle flow structures. A latch is rotatable about a pivot between latched and unlatched positions. The latch maintains the seal in engagement with the first and second nacelle flow structures in the latched position.

In a further embodiment of any of the above, first and second reaction load brackets are affixed relative to the first and second nacelle flow structures. One of the first and second reaction load brackets pivotally supports the latch, and the other of the first and second reaction load brackets includes a tab cooperating with the latch in the latched position.

In a further embodiment of any of the above, the latch assembly includes a cable that is operatively connected to the latch and configured to rotate the latch about the pivot.

In a further embodiment of any of the above, the latch assembly includes a bifurcation arranged in the bypass flowpath. The cable passes through the bifurcation.

In a further embodiment of any of the above, the latch assembly includes first and second drive elements that are respectively connected to the latch and cable and are configured to transmit input from the cable to the latch.

In a further embodiment of any of the above, the first and second drive elements are gears.

In a further embodiment of any of the above, the latch assembly includes a handle connected to the cable. The handle is configured to actuate the latch through the cable.

In a further embodiment of any of the above, the latch assembly includes a coupling that operatively connects the handle to a pair of cables. Each cable unlatches a side having the first and second nacelle flow structures.

In a further embodiment of any of the above, the second nacelle flow structure is movable relative to the first nacelle flow structure about a hinge. A second nacelle flow structure provides inner and outer flow structures that define the bypass flowpath.

In a further embodiment of any of the above, the inner flow structure provides a portion of the core nacelle enclosing a core compartment about a core engine.

In a further embodiment of any of the above, the latch assembly includes a compressed air duct arranged in the core compartment.

In a further embodiment of any of the above, the latch assembly includes a release member is operatively coupled to the latch to override a conventional latch releasing device.

In a further embodiment of any of the above, the latch assembly includes a tool that is removably received by the release member during an emergency latch releasing procedure.

In a further embodiment of any of the above, the latch assembly includes a thrust reverser. The thrust reverser is in an open position to receive the tool in the bypass flowpath.

In another exemplary embodiment, a method of opening a nacelle flow structure includes the steps of pivoting a latch from a latched position to an unlatched position, and unlatching a first nacelle flow structure relative to a second nacelle flow structure in response to the latch pivoting step.

In a further embodiment of any of the above, the method includes the step of operating a handle operatively connected to the latch. The latch pivoting step is performed in response to the handle operating step.

In a further embodiment of any of the above, the method includes the step of operating a release member with a tool subsequent to a failed attempt of a conventional latch releasing procedure.

In a further embodiment of any of the above, the conventional latch releasing procedure includes operating a handle operatively connected to the latch. The latch pivoting step is performed in response to the handle operating step.

In a further embodiment of any of the above, the method includes the step of actuating a thrust reverser to expose a bypass flowpath, and inserting the tool into the bypass flowpath to engage the release member.

BRIEF DESCRIPTION OF THE DRAWINGS

The disclosure can be further understood by reference to the following detailed description when considered in connection with the accompanying drawings wherein:

FIG. 4A is a cross-sectional view illustrating the inner flow structure sealed against a mating structure during normal operating conditions.

FIG. 4B illustrates the inner flow structure unseated from its mating structure during a high pressure core compartment event shown in FIG. 3.

DETAILED DESCRIPTION

Figure 1:
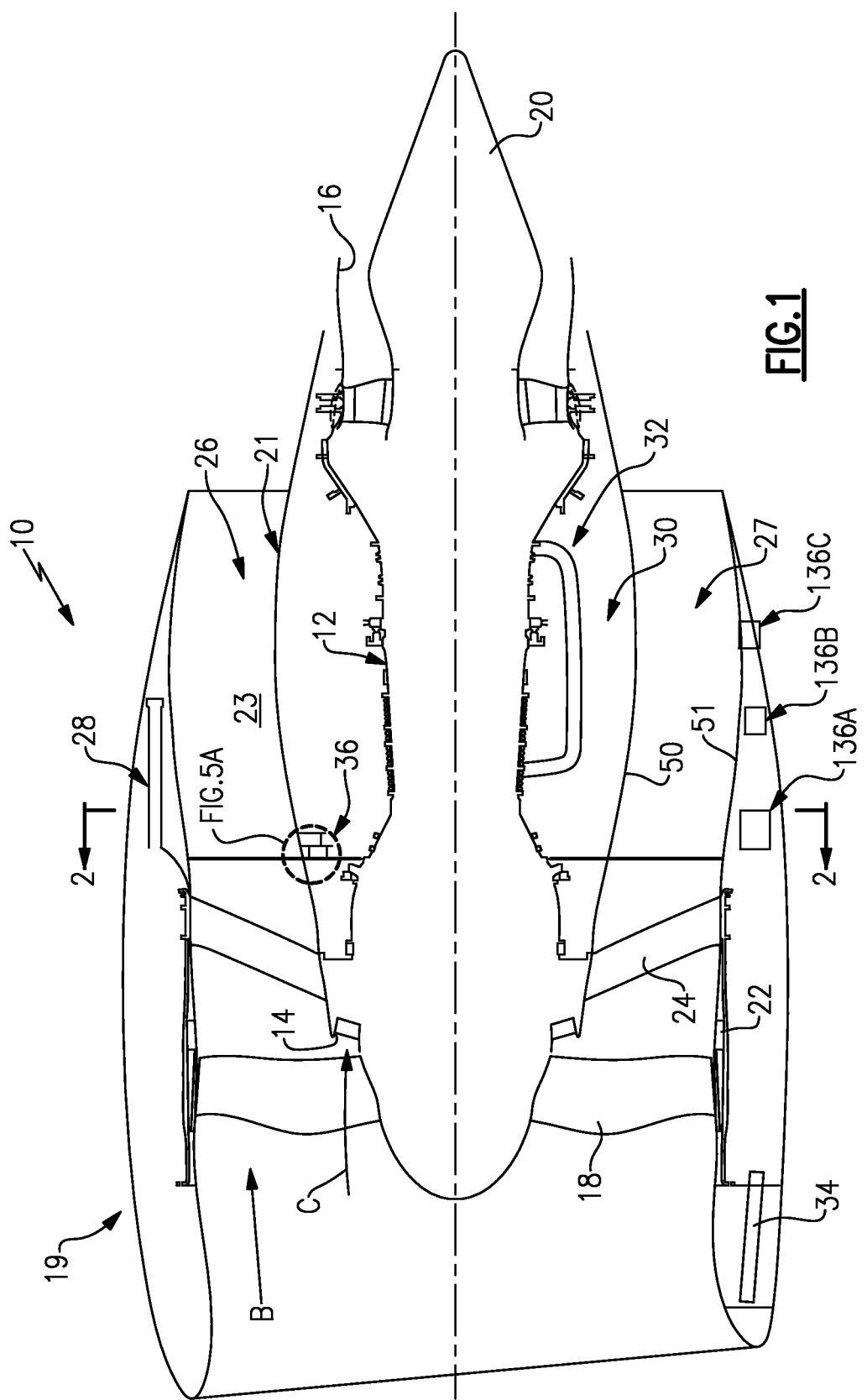
FIG. 1 is a highly schematic view of an example gas turbine engine having an inner flow structure with a latch assembly.

An example gas turbine engine 10 is schematically illustrated in FIG. 1. The engine 10 includes a core engine 12 receiving a core flow C at an inlet 14. The core flow C flows through the core engine 12 and is expelled through an exhaust outlet 16 surrounding a tail cone 20.

Figure 2:
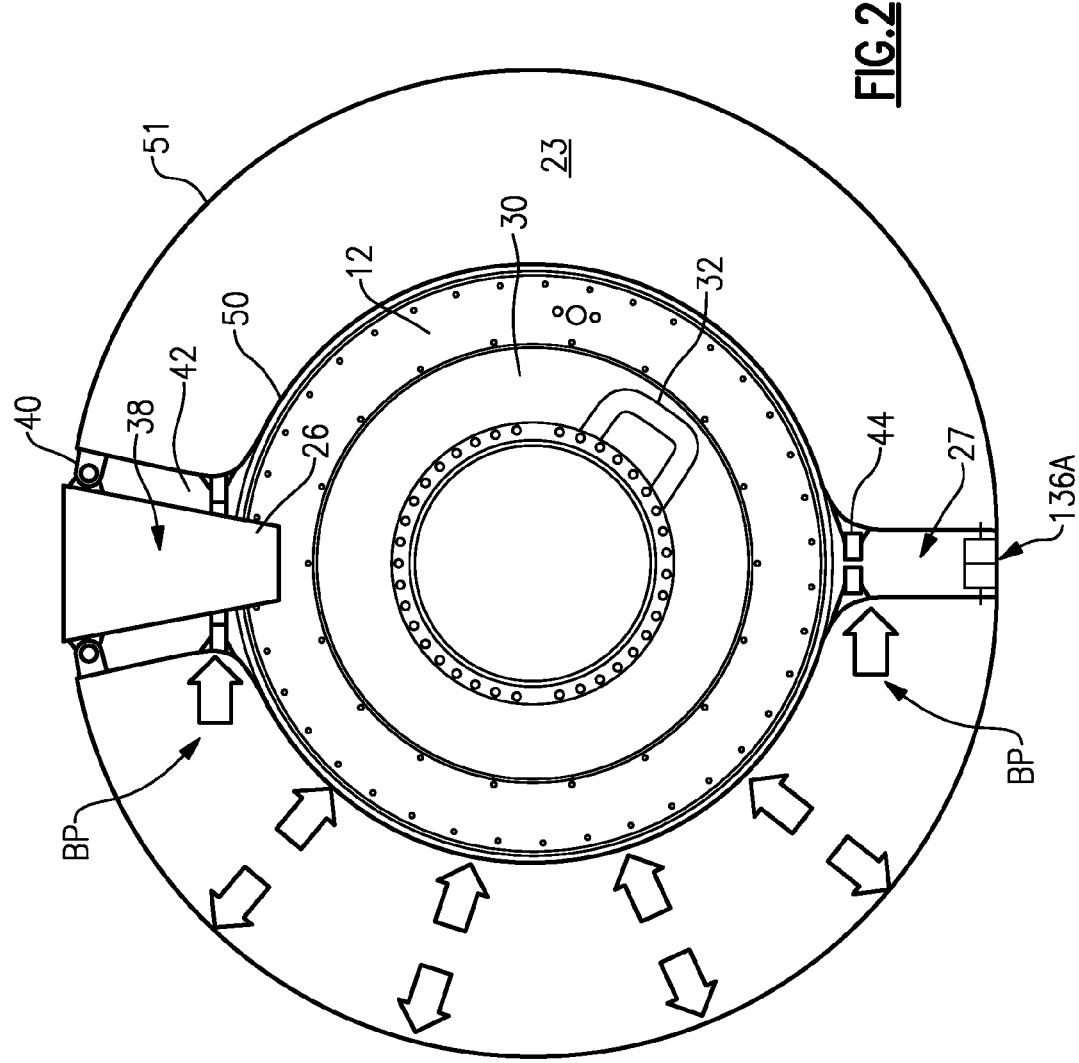
FIG. 2 is a cross-sectional area of the gas turbine engine taken along line 2-2 in FIG. 1 and under normal operating conditions.

The core engine 12 drives a fan 18 arranged in a bypass flowpath 23. A fan case 22 surrounds the fan 18 and provides structure for securing the engine 10 to a pylon 38 (FIG. 2). The fan case 22 is housed within a fan nacelle 19. Multiple circumferentially spaced flow exit guide vanes 24 may extend radially between the fan case 22 and the core engine 12 aft of the fan 18. In one example, the flow exit guide vanes 24 are hollow and may accommodate wires or fluid conduits.

A core nacelle 21 surrounds the core engine 12 and provides a core compartment 30. Various components may be provided in the core compartment 30, such as fluid conduits, for example, a compressed air duct 32. The compressed air duct 32 is under high pressure and may supply compressed air from a low or high pressure compressor stage to a high pressure turbine stage for cooling, for example.

Upper and lower bifurcations 26, 27 may extend radially between the fan and core nacelles 19, 21 in locations opposite one another to accommodate wires, fluid conduit or other components.

The bypass flowpath 23 is provided by inner and outer flow structures 50, 51, which provide portions of the fan and core nacelles 19, 21 along an axial portion of the engine 10. A thrust reverser 28 is arranged outwardly of the outer flow structures 51 in the fan nacelle 19. The inner flow structure 50 is secured about the core compartment 30 with a latch assembly 36, which may be actuated by a handle 34 mounted outside the fan nacelle 19, for example. A cable 70 (FIGS. 6 and 7) may be routed from the handle 34 through one of the upper and lower bifurcations 26, 27 to the latch assembly 36, for example. Additionally, latches may also be used and located as desired. The handle 34 provides a conventional latch releasing device for a conventional latch releasing procedure.

Figure 3:
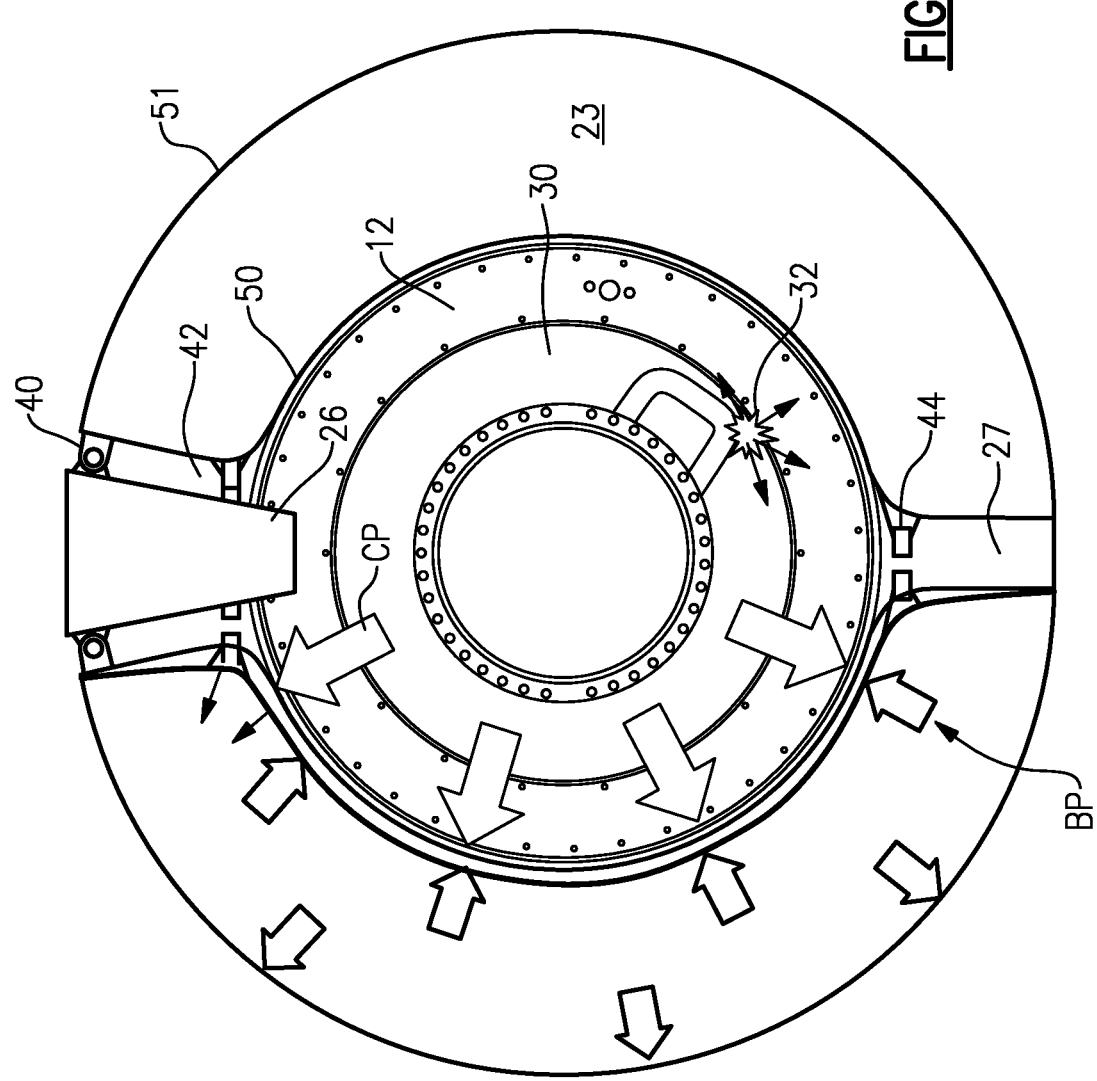
FIG. 3 is a cross-sectional view similar to FIG. 2 during a high pressure core compartment event.

Referring to FIG. 2, the inner and outer flow structures 50, 51, which are integral with one another, are supported relative to the pylon 38 by hinges 40. Upper and lower bumpers 42, 44 support the inner structure 50 relative to the upper and lower bifurcations 26, 27 in a desired position. During normal operation, as illustrated in FIG. 2, bypass pressure BP within the bypass flowpath 23 exerts a force on the inner flow structure 50 that maintains desired engagement with the upper and lower bumpers 42, 44. Referring to FIG. 3, an undesirably high core pressure CP may result from a ruptured pressurized fluid conduit, such as the compressed air duct 32. As a result of such a high pressure core compartment event, the inner flow structure 50 may become deformed, as illustrated on the left half of FIG. 3. During the event, either or both left and right side flow structures may deflect without the disclosed latch.

Referring to FIGS. 4A and 4B, the inner flow structure 50 supports a seal 54 at a leading edge 52. The seal 54 engages a flange 48 of an engine fan case structure 46 with the inner flow structure 50 being flush with the structure 46 during normal operation such that the structure 46 and inner flow structure 50 provide uninterrupted first and second nacelle flow structures. During an event in which an undesired core pressure CP is generated within the core compartment 30, the inner flow structure 50 and seal 54 may be forced radially outward and out of engagement with the flange 48, which permits bypass flow B in a bypass flowpath 23 to enter the core compartment 30. Such a condition may result in damage to the core nacelle 21.

Figure 5A:
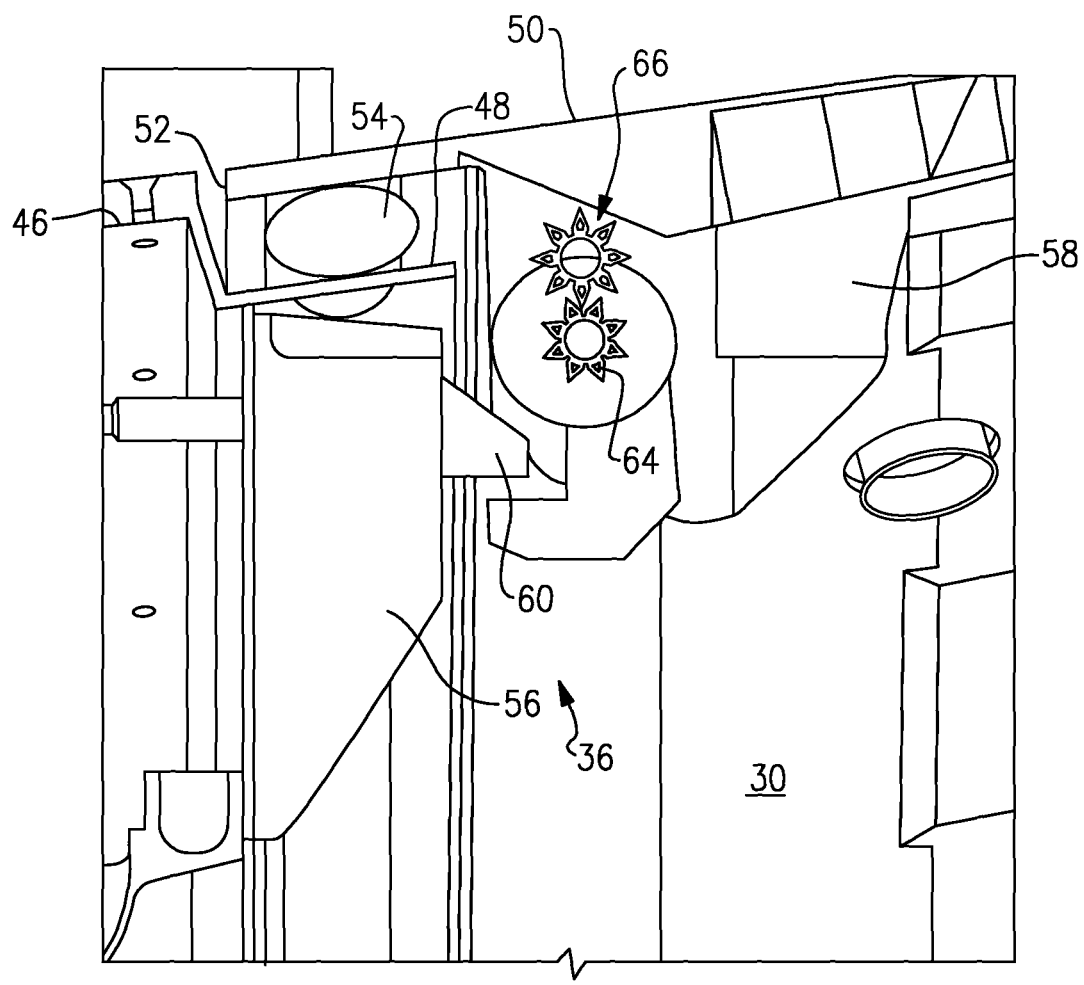
FIG. 5A illustrates the latch assembly in a latched position.
Figure 5B:
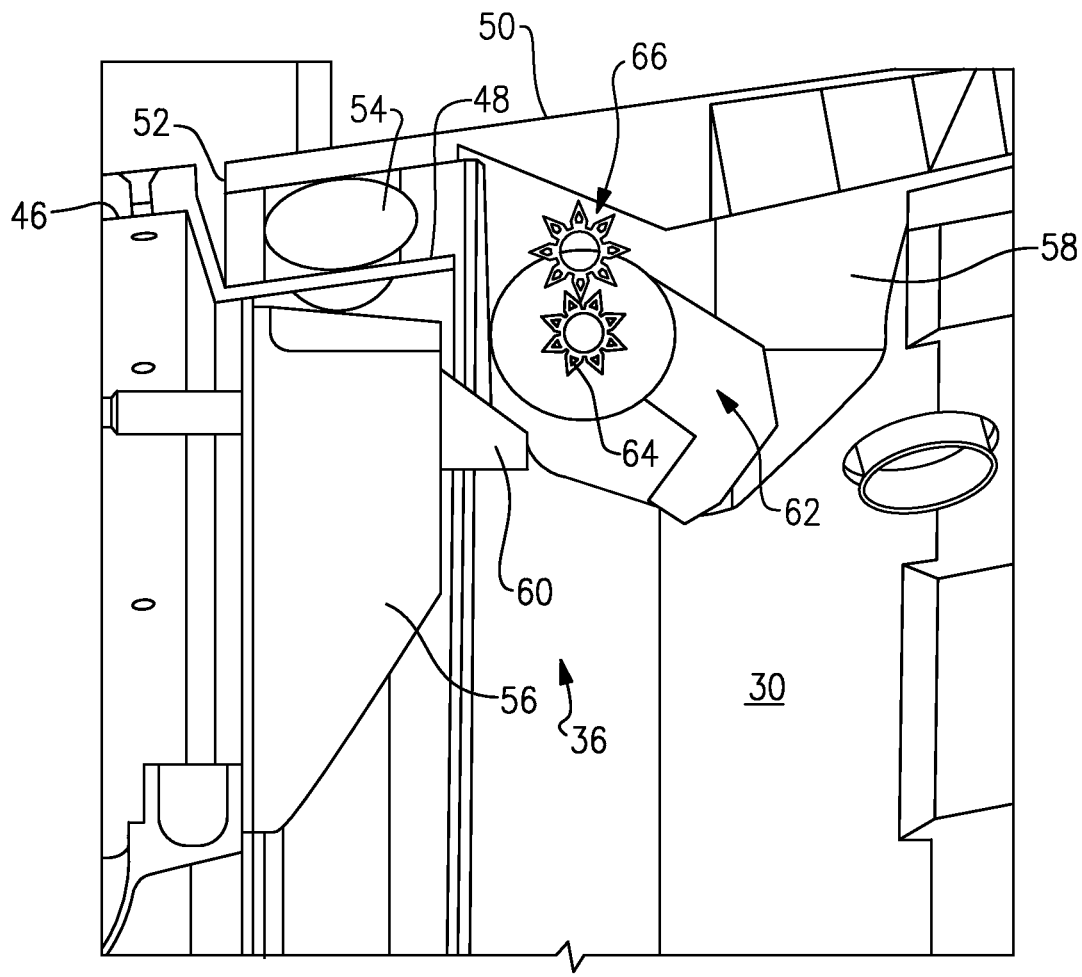
FIG. 5B illustrates the latch assembly in an unlatched position.

Referring to FIGS. 5A and 5B, the latch assembly 36 is arranged near the leading edge 52 prevent deflection of the inner flow structure 50 and maintain the seal 54 in engagement with the flange 48 even if undesired core pressure CP exists. In one example, a first load reaction bracket 56 is supported by the structure 46. A second load reaction bracket 58 is mounted to the inner flow structure 50. The first load reaction bracket 56 includes a tab 60 that cooperates with a latch 62 pivotally mounted to the second load reaction bracket 58 to maintain the position of the inner flow structure 50 when latched, shown in FIG. 5A. In one example, a first drive element 64 is connected to the latch 62. A second drive element 66 cooperates with the first drive element 64 and is operably connected to the handle 34 (FIG. 1) for actuation of the latch assembly 36. In one example, the first and second drive elements 66, 68 are gears that transmit input to the latch 62. FIG. 5B illustrates the latch 62 in an open position in which the latch 62 is disengaged from the tab 60. Latch assembly 36 may use a different configuration of drive elements, if desired.

Figure 7:
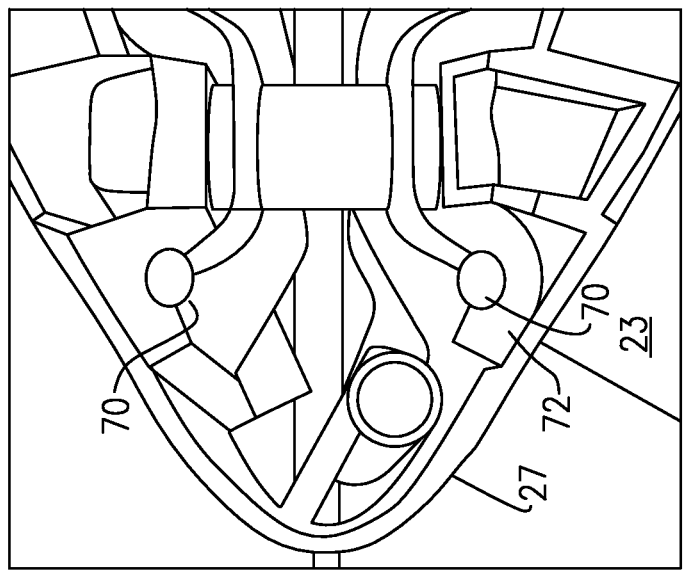
FIG. 7 is a cross-sectional view through the lower bifurcation along line 7-7 in FIG. 6.
Figure 6:
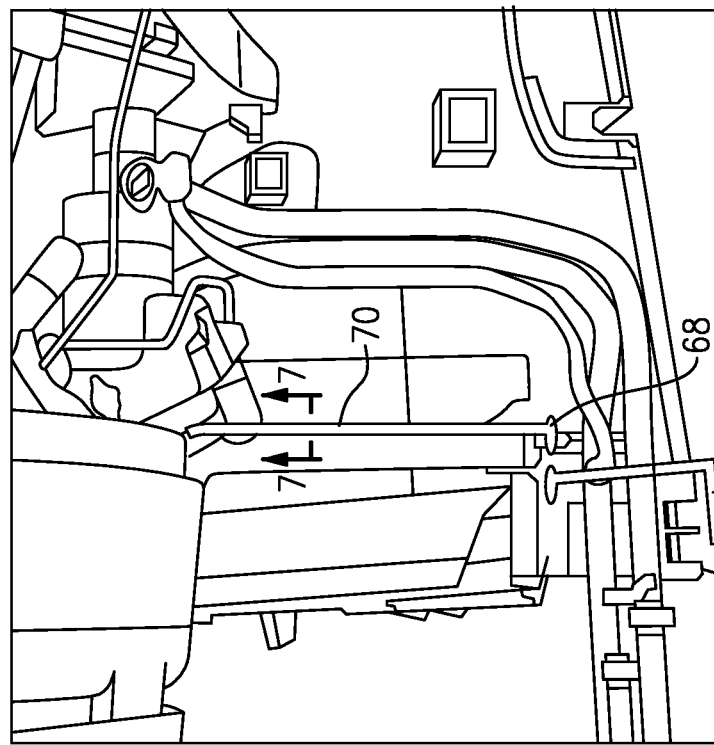
FIG. 6 illustrates a lower bifurcation with a handle and cable for latching and unlatching the latch assembly.

FIGS. 6 and 7 illustrate one example routing of cables 70 interconnecting the handle 34 to the latch assembly 36. The cable 70 rotates the latch 62 about its pivot. One cable 70 may be provided for each half of the inner flow structure 50 provided on either side of the engine 10, illustrated in FIG. 2. The handle 34 may be positioned at the lower bifurcation 27. A coupling 68 mechanically interconnects the handle 34 to cables 70, which are arranged within a cavity 72 of the lower bifurcation 27.

Alternatively or additionally, the latch 36 may be located in the aft section of the core nacelle 21. The latches 136A-C may also be used to secure the left and right halves of the flow structures to one another, as best shown in FIGS. 1 and 2.

Figures 8A, 8B:
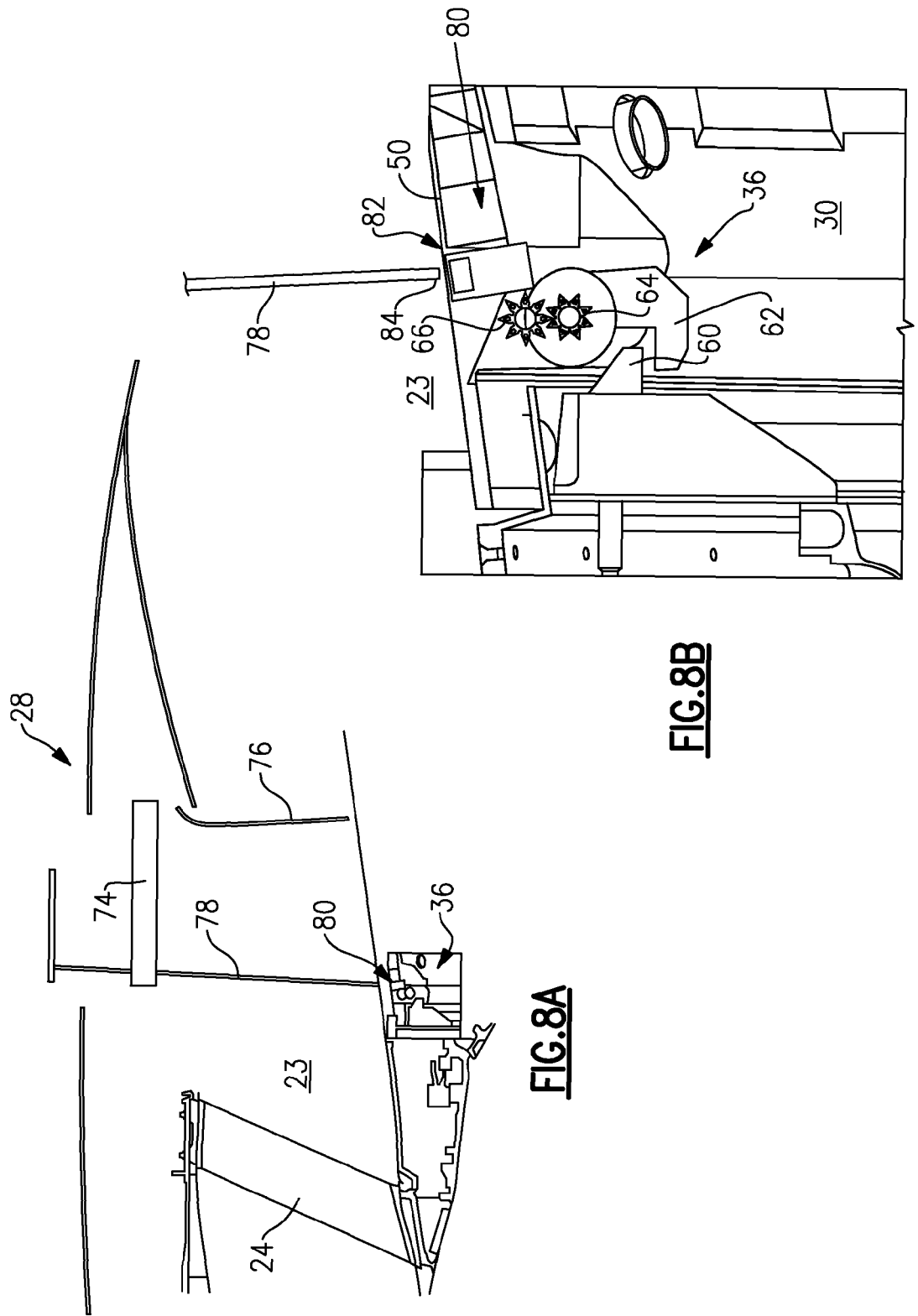
FIG. 8A is a schematic view through a thrust reverser of the gas turbine engine, which provides access to a stuck latch assembly.
FIG. 8B is an enlarged view of the latch assembly illustrated in FIG. 8A.

In the event that the latch assembly 36 becomes stuck or a cable 70 breaks, a release member 80 may cooperate with the latch assembly 36 to release the latch 62 and override the conventional latch releasing procedure and provide an emergency release of the latch 62. In one example, the thrust reverser 28 is actuated to expose the bypass flowpath 23 and the release member 80. With the thrust reverser 28 actuated, the blocker doors 76 are disposed within the bypass flowpath 23 and the cascade assembly 74 is exposed. A tool 78 may be passed through the cascade assembly 74 into the bypass flowpath 23 to engage the release member 80. As illustrated in FIG. 8B, an end 84 of the tool 78 may be received in a head 82 of the release member 80. The release member 80 may cooperate with one or more of the first and second drive elements 64, 66 to rotate the latch 62 out of engagement with the tab 60. The illustration of the release member 80 is schematic.

Although an example embodiment has been disclosed, a worker of ordinary skill in this art would recognize that certain modifications would come within the scope of the claims. For that reason, the following claims should be studied to determine their true scope and content.

What is claimed is:

1. A latch assembly for securing a nacelle portion of a gas turbine engine comprising:
    first and second nacelle flow structures defining a portion of a bypass flowpath;
    a seal engageable between the first and second nacelle flow structures;
    a latch rotatable about a pivot between latched and unlatched positions, the latch maintaining the seal in engagement with the first and second nacelle flow structures in the latched position; and
    first and second reaction load brackets are affixed relative to the first and second nacelle flow structures, one of the first and second reaction load brackets pivotally supporting the latch, and the other of the first and second reaction load brackets including a tab cooperating with the latch in the latched position.

2. The latch assembly according to claim 1, comprising a cable operatively connected to the latch and configured to rotate the latch about the pivot.

3. The assembly according to claim 2, comprising a bifurcation arranged in the bypass flowpath, the cable passing through the bifurcation.

4. The latch assembly according to claim 2, comprising first and second drive elements respectively connected to the latch and cable and configured to transmit input from the cable to the latch.

5. The latch assembly according to claim 4, wherein the first and second drive elements are gears.

6. The latch assembly according to claim 2, comprising a handle connected to the cable, the handle configured to actuate the latch through the cable.

7. The latch assembly according to claim 6, comprising a coupling operatively connecting the handle to a pair of cables, each cable unlatching a side having the first and second nacelle flow structures.

8. A latch assembly for securing a nacelle portion of a gas turbine engine comprising:
    first and second nacelle flow structures defining a portion of a bypass flowpath;
    a seal engageable between the first and second nacelle flow structures; and
    a latch rotatable about a pivot between latched and unlatched positions, the latch maintaining the seal in engagement with the first and second nacelle flow structures in the latched position, wherein the second nacelle flow structure is movable relative to the first nacelle flow structure about a hinge, second nacelle flow structure providing inner and outer flow structures defining the bypass flowpath.

9. The latch assembly according to claim 8, wherein the inner flow structure provides a portion of the core nacelle enclosing a core compartment about a core engine.

10. The latch assembly according to claim 9, comprising a compressed air duct arranged in the core compartment.

11. A latch assembly for securing a nacelle portion of a gas turbine engine comprising;
    first and second nacelle flow structures defining a portion of a bypass flowpath;
    a seal engageable between the first and second nacelle flow structures;
    a latch rotatable about a pivot between latched and unlatched positions, the latch maintaining the seal in engagement with the first and second nacelle flow structures in the latched position; and
    a release member operatively coupled to the latch to override a conventional latch releasing device.

12. The latch assembly according to claim 11, comprising a tool removably received by the release member during an emergency latch releasing procedure.

13. The latch assembly according to claim 12, comprising a thrust reverser, the thrust reverser in an open position to receive the tool in the bypass flowpath.

14. A method of opening a nacelle flow structure comprising the steps of:
    operating a handle operatively connected to a latch;
    pivoting the latch from a latched position to an unlatched position, the latch pivoting step performed in response to the handle operating step; and
    unlatching a first nacelle flow structure relative to a second nacelle flow structure in response to the latch pivoting step.

15. A method of opening a nacelle flow structure comprising the steps of:
    pivoting a latch from a latched position to an unlatched position;
    unlatching a first nacelle flow structure relative to a second nacelle flow structure in response to the latch pivoting step; and
    operating a release member with a tool subsequent to a failed attempt of a conventional latch releasing procedure.

16. The method according to claim 15, wherein the conventional latch releasing procedure includes operating a handle operatively connected to the latch, the latch pivoting step performed in response to the handle operating step.

17. The method according to claim 15, comprising the step of actuating a thrust reverser to expose a bypass flowpath, and inserting the tool into the bypass flowpath to engage the release member.

* * * * *